US009332033B2

(12) United States Patent
Sobel et al.

(10) Patent No.: US 9,332,033 B2
(45) Date of Patent: May 3, 2016

(54) METHODS AND SYSTEMS FOR ENABLING COMMUNITY-TESTED SECURITY FEATURES FOR LEGACY APPLICATIONS

(71) Applicant: Symantec Corporation, Mountain View, CA (US)

(72) Inventors: William E. Sobel, Jamul, CA (US); Sourabh Satish, Fremont, CA (US)

(73) Assignee: Symantec Corporation, Mountain View, CA (US)

( * ) Notice: Subject to any disclaimer, the term of this patent is extended or adjusted under 35 U.S.C. 154(b) by 141 days.

(21) Appl. No.: 14/163,071

(22) Filed: Jan. 24, 2014

(65) Prior Publication Data

US 2014/0143828 A1    May 22, 2014

Related U.S. Application Data

(63) Continuation of application No. 12/336,668, filed on Dec. 17, 2008, now Pat. No. 8,713,687.

(51) Int. Cl.
| | |
|---|---|
| *G06F 12/14* | (2006.01) |
| *H04L 29/06* | (2006.01) |
| *G06F 21/60* | (2013.01) |
| *G06F 21/55* | (2013.01) |
| *G06F 21/57* | (2013.01) |
| *G06F 21/12* | (2013.01) |

(52) U.S. Cl.
CPC .............. *H04L 63/20* (2013.01); *G06F 21/125* (2013.01); *G06F 21/126* (2013.01); *G06F 21/552* (2013.01); *G06F 21/577* (2013.01); *G06F 21/604* (2013.01); *H04L 63/145* (2013.01); *H04L 63/1433* (2013.01)

(58) Field of Classification Search
CPC . G06F 21/604; G06F 21/577; H04L 63/1433; H04L 63/145
USPC .............................................. 726/25; 713/188
See application file for complete search history.

(56) References Cited

U.S. PATENT DOCUMENTS

| 6,167,358 A | 12/2000 | Othmer et al. |
| 6,324,647 B1 | 11/2001 | Bowman-Amuah |
| 7,765,579 B2 | 7/2010 | Wallace |

(Continued)

OTHER PUBLICATIONS

Yau et al.; Some Stability Measures for Software Maintenance; 1980; Retrieved from the Internet <URL: ieeexplore.ieee.org/xpls/abs_all.jsp?arnumber=1702781&tag=1>; pp. 1-8 as printed.*

(Continued)

*Primary Examiner* — Aravind Moorthy
(74) *Attorney, Agent, or Firm* — ALG Intellectual Property, LLC (57) ABSTRACT

A computer-implemented method for enabling community-tested security features for legacy applications may include: 1) identifying a plurality of client systems, 2) identifying a legacy application on a client system within the plurality of client systems, 3) identifying a security-feature-enablement rule for the legacy application, 4) enabling at least one security feature for the legacy application by executing the security-feature-enablement rule, 5) determining the impact of the security-feature-enablement rule on the health of the legacy application, and then 6) relaying the impact of the security-feature-enablement rule on the health of the legacy application to a server. Various other methods, systems, and computer-readable media are also disclosed.

20 Claims, 6 Drawing Sheets

(56) References Cited

U.S. PATENT DOCUMENTS

| | | | |
|---|---|---|---|
| 2006/0195745 | A1 | 8/2006 | Keromytis et al. |
| 2006/0259809 | A1 | 11/2006 | Mishra et al. |
| 2006/0259946 | A2* | 11/2006 | Oliphant .......................... 726/1 |
| 2007/0240151 | A1 | 10/2007 | Marl et al. |
| 2008/0229149 | A1 | 9/2008 | Penton |
| 2009/0199160 | A1 | 8/2009 | Vaitheeswaran et al. |

OTHER PUBLICATIONS

No stated author; NetIQ work smarter Guide, Planning and Configuration Guide for AppManager; 2000; retrieved from the Internet <URL: .netiq.com/ja-jp/support/jp/appmanager/download_techdoc/planning.pdf>; pp. 1-194 as printed.*

Mozilla Developer Network, "Firefox Community Beta Program", https://dev.mozilla.jp/localmdc/localmdc_138.html, (Mar. 15, 2007).

"Firefox Community Beta Program", Mozilla Developer Center Beta; developer.mozilla.org, retrieved from internet; URL: https://developer.mozilla.org/devnews/index.php/2007/03/15/firefox-community-beta-program/, (Mar. 15, 2007), entire document.

"ISO/IEC/IEEE Standard for Systems and Software Engineering—Software Life Cycle Processes", IEEE Standard, (Jan. 31, 2008), C1-138.

Wikipedia, "Regression Testing", Internet Citation; URL: http://en.wikipedia.org/w/index.php?title=Regression_testing&oldid=25, (Nov. 19, 2008), 1-3.

"Firefox Talkback", Internet citation; URL:http://omor.com/SF/archives/2004/11/firefox_talkbac_1.html, (Nov. 24, 2004), whole document.

Zhu, Feng et al., "Automating Regression Testing for Real-Time Software in a Distributed Environment", Proceedings 1998; First Internationl Symposium on Object-Oriented Real-Time Distributed Computing, Kyoto; Japan, (Apr. 20, 1998), 373-382.

Wikipedia, "Patch (computing)", Internet citation; URL:http://en.wikipeia.org/w/index.php?title=Patch_%28computing%29&oldid=247215376, retrieved on May 25, 2011, (Oct. 23, 2008), whole document.

Wikipedia, "Software_Update", Internet Citation; URL:http://en.wikipedia.org/w/index.php?title=Software_update&redirect=no, retrieved on May 26, 2011, (Mar. 5, 2008), whole document.

Mayank, "Howto: Speed up Firefox Startup", The GLog (Geek bLOG);, (Sep. 14, 2008), whole document.

Sourabh Satish; Systems and Methods for Determining and Quantifying the Impact of an Application on the Health of a System; U.S. Appl. No. 12/049,751, filed Mar. 17, 2008.

Sourabh Satish; Method for Determining the Health Impact of an Application Based on Information Obtained from Like-Profiled Computing Systems Using Clustering; U.S. Appl. No. 12/056,379, filed Mar. 27, 2008.

Shultz, Greg, "Troubleshoot with the Problem Reports and Solutions feature in Windows Vista", http://www.techrepublic.com/blog/window-on-windows/troubleshoot-with-the-problem-reports-and-solutions-feature-in-windows-vista/765, as accessed on Jul. 18, 2013, (Aug. 2008), 1-6.

Hamilton, James, "On Designing and Deploying Internet-Scale Services", https://www.usenix.org/legacy/event/lisa07/tech/full_papers/hamilton/hamilton_html/, as accessed on Jul. 18, 2013, Proceedings of the 21st Large Installation System Administration Conference (LISA '07) (Dallas, TX: USENIX Association), (2007), 1-14.

Buck, Bryan et al., "An API for Runtime Code Patching", http://hpc.sagepub.com/content/14/4/317, as accessed on Jul. 18, 2013, International Journal of High Performance Computing Applications 2000 14: 317 DOI: 10.1177/1 09434200001400404, (2000), 1-14.

Howard, Michael, "FAQ about HeapSetInformation in Windows Vista and Heap Based Buffer Overruns", http://blogs.msdn.com/b/michael_howard/archive/2008/02/18/faq-about-heapsetinformation-in-windows-vista-and-heap-based-buffer-overruns.aspx, as accessed on Jul. 18, 2013, (Feb. 2008), 1-3.

Altiris, Inc., "Application Control Solution", (2007).

* cited by examiner

First Application-Health Evaluation 300

First Stability Index 302

| | |
|---|---|
| Running Average of Blue-Screen Errors | 0 |
| Running Average of Service Errors | 1 |
| Running Average of Application Errors | 1 |

304 { Running Average of Blue-Screen Errors, Running Average of Service Errors }
306 { Running Average of Application Errors }

First Performance Index 312

| | |
|---|---|
| Running Average of CPU Usage | 2.1875 |
| Maximum CPU Usage | 7 |
| Running Average of Page Faults | 248.4375 |
| Maximum Number of Page Faults | 844 |
| Running Average of IP Datagrams | 3.2500 |
| Maximum Number of IP Datagrams | 8 |

314 { CPU, Page Faults }
316 { IP Datagrams }

Second Application-Health Evaluation 320

Second Stability Index 322

| | |
|---|---|
| Running Average of Blue-Screen Errors | 0 |
| Running Average of Service Errors | 2 |
| Running Average of Application Errors | 3 |

324 { Blue-Screen, Service }
326 { Application }

Second Performance Index 332

| | |
|---|---|
| Running Average of CPU Usage | 10.1999 |
| Maximum CPU Usage | 58 |
| Running Average of Page Faults | 960.8500 |
| Maximum Number of Page Faults | 3423 |
| Running Average of IP Datagrams | 3.2500 |
| Maximum Number of IP Datagrams | 9 |

334 { CPU, Page Faults }
336 { IP Datagrams }

Health-Impact Scores 340

Stability Impact 342

| | |
|---|---|
| Blue-Screen Errors Impact | 0% |
| Service Errors Impact | -50% |
| Application Errors Impact | -50% |

Performance Impact 346

| | |
|---|---|
| Average CPU Usage Impact | -78.5539% |
| Maximum CPU Usage Impact | -87.9130% |
| Average Page Faults Impact | -74.1440% |
| Maximum Page Faults Impact | -75.3433% |
| Average IP Datagrams Impact | 0% |
| Maximum IP Datagrams Impact | -11.1111% |

Average Health Impact 348

| | |
|---|---|
| Average Stability Impact | -33.3333% |
| Average Performance Impact | -55.5109% |
| Average Health Impact | -44.4421% |

METHODS AND SYSTEMS FOR ENABLING COMMUNITY-TESTED SECURITY FEATURES FOR LEGACY APPLICATIONS

CROSS REFERENCE TO RELATED APPLICATION

This application is a continuation of U.S. application Ser. No. 12/336,668, filed 17 Dec. 2008, the disclosure of which is incorporated, by this reference, in its entirety.

BACKGROUND

Consumers and businesses frequently rely on legacy applications. Legacy applications may be time-tested, inexpensive, and may provide a continuity of experience or workflow. However, legacy applications may not be updated to take advantage of new features on the systems on which they run. This may include new security features that may prevent security exploits in the legacy applications, such as heap corruption.

Even if new security features are enabled for legacy applications, the security features might interfere with the functionality or stability of the applications. While an application vendor may test each new security feature for each legacy application offered by the vendor, this may prove to be a costly burden.

SUMMARY

The instant disclosure is directed to methods and systems for enabling community-tested security features for legacy applications. Various embodiments describe a client module on a plurality of computing devices, a server module on a server, and interactions between them. As will be described in greater detail below, these modules may be used to retroactively enable security features for legacy applications and to test whether the introduction of these new security features negatively impacts the stability, performance, or functionality (collectively, "health") of the legacy application. In one example, the system may first test a security feature or combination of security features for a legacy application across a subset of users that have opted in for early testing of security features prior to enabling the security features within the entire community of users. If the new security features do not negatively impact the health of legacy applications on systems within the subset of users, then the system may initiate a staged roll-out of the security features to an increasing number of users within the community.

For example, the client module described above may be programmed to: 1) identify startup of a legacy application on a client system, 2) identify a security-feature-enablement rule (received, for example, from a server) for the legacy application, and then 3) enable at least one security feature for the legacy application by executing the security-feature-enablement rule. In one embodiment, the security-feature-enablement rule may enable a security feature or combination of security features for a particular legacy application.

After executing the security-feature-enablement rule, the client module may then determine the impact of the security-feature-enablement rule on the health of the legacy application. In some embodiments, the client module may determine the impact of the security-feature-enablement rule by: 1) performing a first application-health evaluation (to determine, for example, the performance or stability of the legacy application) before executing the security-feature-enablement rule, 2) performing a second application-health evaluation after executing the security-feature-enablement rule, and then 3) comparing the first and second application-health evaluations. After determining the impact of the security-feature-enablement rule on the health of the legacy application, the client module may relay information that identifies this impact to a server.

In another embodiment, a server module may be programmed to: 1) identify a community of users using the client module, 2) identify a subset of users within the community that have opted in to early testing of security features for legacy applications, and then 3) transmit a security-feature-enablement rule to at least one client system in the subset. The server module may then receive health-impact information from at least one of the client systems in the subset that identifies the impact of the security-feature-enablement rule on the health of a legacy application on the client system. The server module may then analyze this health impact information to determine whether to initiate a staged roll-out of the security-feature-enablement rule to the remainder of the users within the community. For example, if the server module determines, based on the health-impact information received from the subset of users, that the security-feature-enablement rule does not negatively impact application health, then the server module may begin to deploy the security-feature-enablement rule to the broader community in a staged fashion.

If, either before or after initiating the staged roll-out, the server module receives health-impact information that indicates that the security-feature-enablement rule negatively impacted the health of the legacy application on at least one client system, the server module may then abort the staged roll-out of the security-feature-enablement rule.

Features from any of the above-mentioned embodiments may be used in combination with one another in accordance with the general principles described herein. Embodiments of the present disclosure may provide various advantages over prior technologies. For example, the methods described herein may allow users to run their legacy applications with new security features that might otherwise not be enabled. Further advantages may accrue to security vendors, who may use this method to test new security features on legacy applications at less expense than otherwise. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Figure 1:
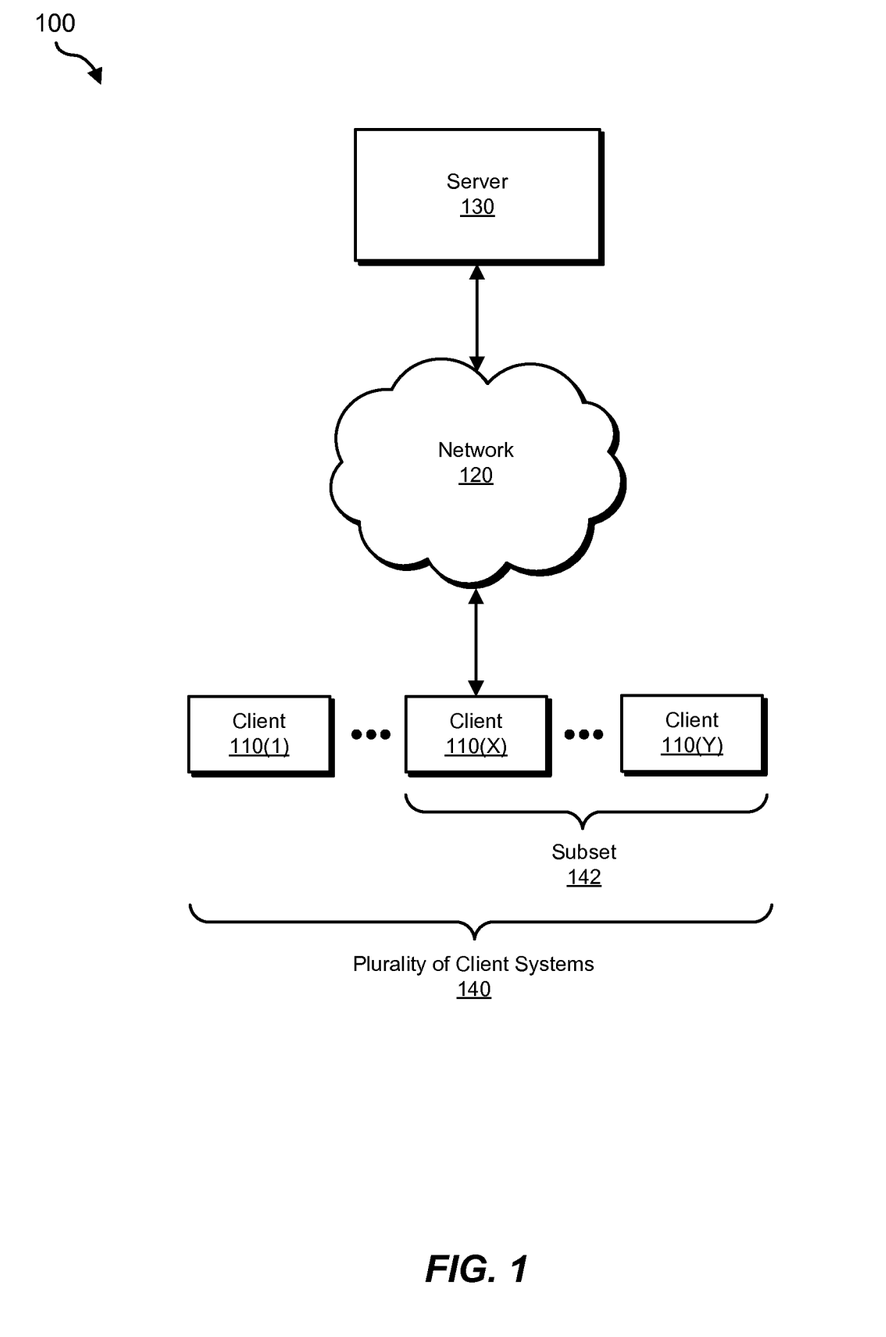
FIG. 1 is a block diagram of an exemplary system for enabling community-tested security features for legacy applications
Figure 2:
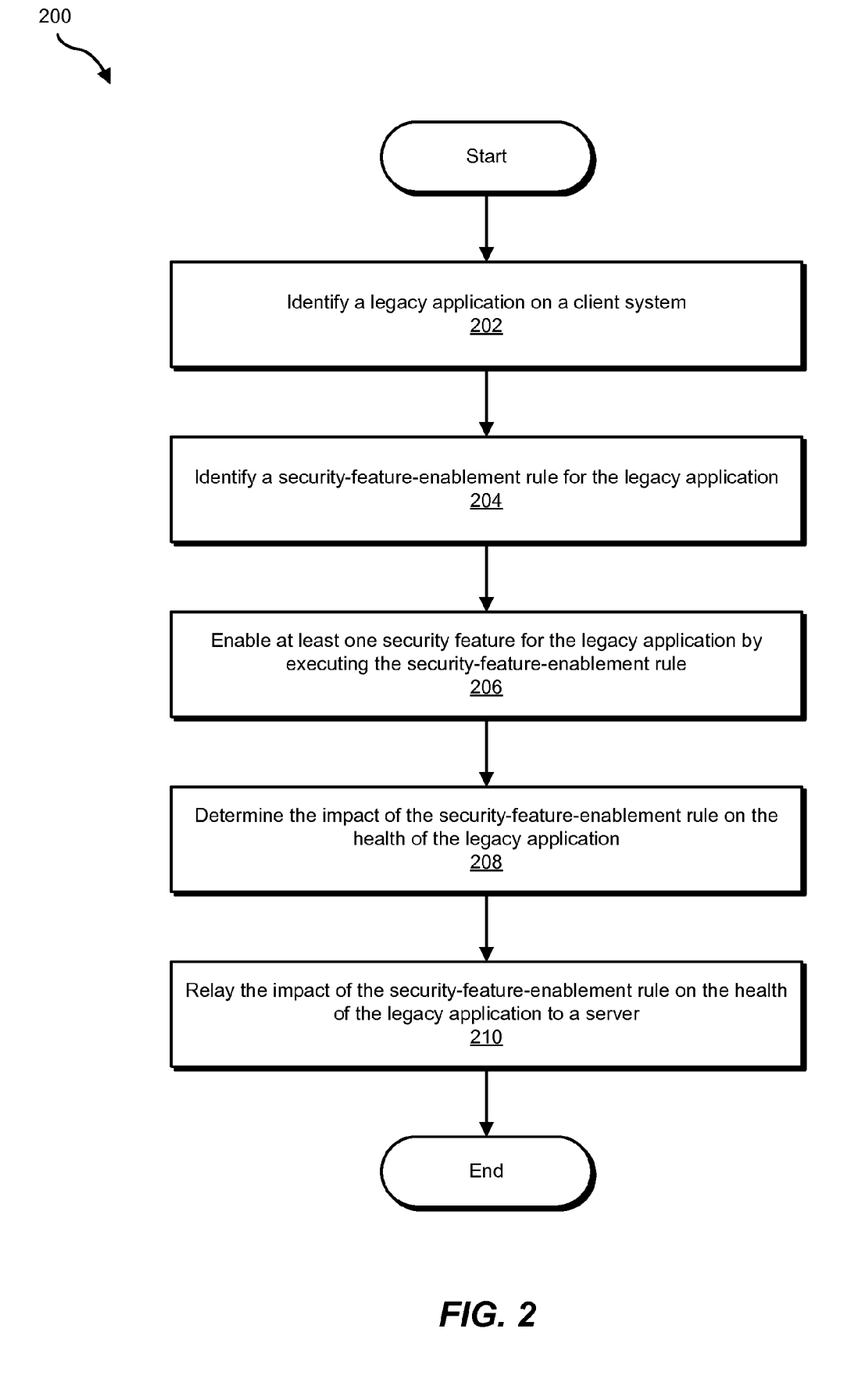
FIG. 2 is a flow diagram of an exemplary computer-implemented method for enabling community-tested security features for legacy applications.
Figure 4:
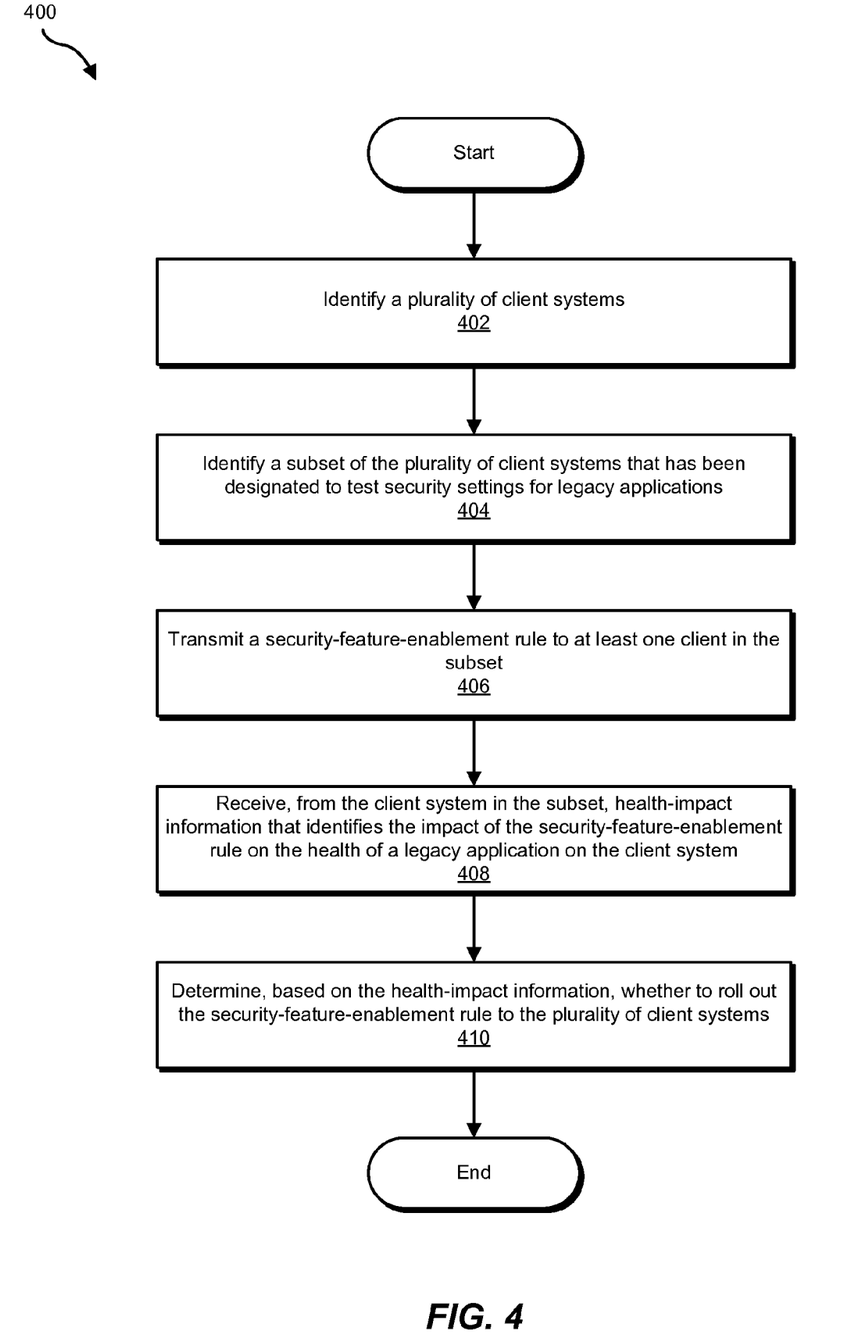
FIG. 4 is a flow diagram of an exemplary computer-implemented method for enabling community-tested security features for legacy applications according to an additional embodiment.

Embodiments of the present disclosure provide various methods and systems for enabling community-tested security features for legacy applications. As previously mentioned, a server may direct certain subsets of clients to test certain security features and later roll out these settings to the entire community of clients. Accompanying drawings illustrate methods and systems for accomplishing this. FIG. 1 shows a server connected to a plurality of clients across a network. FIG. 2 shows steps that may be performed by a client module existing on the clients. FIG. 4 shows steps that may be performed by a server module existing on the server.

FIG. 1 is a block diagram of an exemplary system 100 for enabling community-tested security features for legacy applications. As illustrated in this figure, exemplary system 100 may comprise a server 130 in communication with a plurality of client systems 140 via a network 120.

Client systems 140 (consisting of clients 110(1) through 110(Y)) generally represent any type or form of client-side computing device. Examples of client systems 140 include, without limitation, laptops, desktops, cellular phones, personal digital assistants (PDAs), multimedia players, embedded systems, combinations of one or more of the same, exemplary computing system 510 in FIG. 5, or any other suitable computing device. Similarly, server 130 generally represents any type or form of centralized or server-side computing device Network 120 generally represents any medium or architecture capable of facilitating communication or data transfer. Examples of network 120 include, without limitation, an intranet, a wide area network (WAN), a local area network (LAN), a personal area network (PAN), the Internet, power line communications (PLC), a cellular network (e.g., GSM network), exemplary network architecture 550 in FIG. 5, or the like. Network 120 may facilitate communication or data transfer using wireless or wired connections. In one embodiment, network 120 may facilitate communication between server 130 and client systems 140, consisting of clients 110(1) through 110(Y).

In one example, a server module may be installed on server 130. Similarly, a client module may be installed on each of clients 110(1) through 110(Y). These modules may represent any module, application, or other computer-executable code capable of performing one or more of the steps disclosed herein. In addition, one or more of these modules may be shared between server 130 and clients 110(1) through 110(Y), meaning that the same module may be configured to operate simultaneously on separate devices for a single purpose.

FIG. 2 is a flow diagram of an exemplary client-side method 200 for enabling community-tested security features for legacy applications. As illustrated in this figure, at step 202 a client-side module may identify a legacy application on a client system. For example, a client module stored and configured to run on client 110(1) in FIG. 1 may identify a legacy application on client 110(1).

The client module may perform step 202 in a variety of ways. In one example, the client module may create, or have access to, a list of legacy applications on the client system. In an additional example, the client module may inspect an application on its startup and determine that the application is a legacy application by referring to a list, by analyzing application metadata, or by requesting information from a server.

At step 204, the client module may identify a security-feature-enablement rule for the legacy application. For example, a client module on client 110(1) in FIG. 1 may identify a security-feature-enablement rule for the legacy application identified in step 202. As detailed above, a security-feature-enablement rule may represent any type or form of file, module, or other computer-readable instruction for enabling a security feature, or combination of security features, for a particular legacy application. Examples of security features and settings that security-feature-enablement rules may enable include, without limitation, the ability to revoke rights for a particular legacy application (by, for example, specifying a list of rights that the legacy application will never use), the ability to terminate a process upon heap corruption for a particular legacy application, or any other security feature.

The client module may perform step 204 in a variety of ways. In one example, the client module (which may, as detailed above, be stored and configured to run on one of client systems 140 in FIG. 1) may receive the security-feature-enablement rule from a server, such as server 130 in FIG. 1. In an additional embodiment, the client module may identify one or more security-feature-enablement rules stored or loaded onto the client system. In this example, the client module may, upon identifying the legacy application, identify at least one security-feature-enablement rule stored on the client system that is associated with the legacy application.

At step 206, the client module may enable at least one security feature for the legacy application by executing the security-feature-enablement rule. For example, a client module on client 110(1) in FIG. 1 may enable a security feature for the legacy application identified in step 202 by executing the security-feature-enablement rule identified in step 204.

The client module may perform step 206 in a variety of ways. In one example, the client module might inject an instruction into the legacy application's code that enables a security feature available on the client system. For example, the client system might use MICROSOFT VISTA as an operating system, and the security-feature-enablement rule might enable heap corruption termination for a legacy application. In this example, the client module might inject the HeapSetInformation function into the legacy application code on startup to cause the legacy application to enable heap corruption termination.

In an additional example, the client module may enable the security feature for the legacy application by: 1) identifying startup of the legacy application, 2) retrieving a security configuration for the legacy application, and then 3) enabling a security feature in the security configuration, as specified by the security-feature-enablement rule At step 208, the client module may determine whether the security-feature-enablement rule impacted the health of the legacy application. In other words, the client module may determine whether the enabled security feature negatively impacted the stability, performance, or functionality of the legacy application. For example, if, in the previous example, the legacy application had a benign error that caused temporary heap corruption, enabling heap corruption termination might render the legacy application unusable. In this example, the client module may determine that the security-feature-enablement rule negatively impacted the health of the legacy application.

The client module may perform step 208 in a variety of ways. In one example, the client module may determine whether the security-feature-enablement rule negatively impacted the health of the legacy application by: 1) performing a first application-health evaluation before executing the security-feature-enablement rule, 2) performing a second application-health evaluation after executing the security-feature-enablement rule, and then 3) comparing the first and second application-health evaluations to determine whether the security-feature-enablement rule impacted the health of the application.

The phrase "application-health evaluation," as used herein, generally refers to any type or form of evaluation used to determine the health of an application. Examples of application-health evaluations include, without limitation, performance evaluations (which may measure the performance of various aspects of an application, such as memory usage, CPU usage, and page faults) and stability evaluations (which may measure the stability of an application by determining, for example, the number of errors encountered by an application). An illustration of the results of two such application-health evaluations is provided in FIG. 3. As illustrated in this figure, first and second application-health evaluations 300 and 320 may comprise stability indexes 302 and 322 and performance indexes 312 and 332.

In certain embodiments, stability indexes 302 and 322 may comprise a plurality of stability metrics 304 and 324 and results 306 and 326 for each of these metrics. Stability metrics 304 and 324 generally represent any type or form of metric that may be used to measure the stability of an application. Examples of values that stability metrics may measure include, without limitation, operating-system errors (such as blue-screen errors), application errors (such as application hangs or freezes), service errors, device-driver errors, system uptime, and system reboots (such as the number of system reboots per day). In the examples provided in FIG. 3, stability indexes 302 and 322 detail the average number of blue-screen errors identified by the client module during the evaluation period, the average number of service errors identified, and the average number of application errors identified. In some embodiments, one or more of these errors may be caused by the security-feature-enablement rule executed in step 206.

Figure 3:
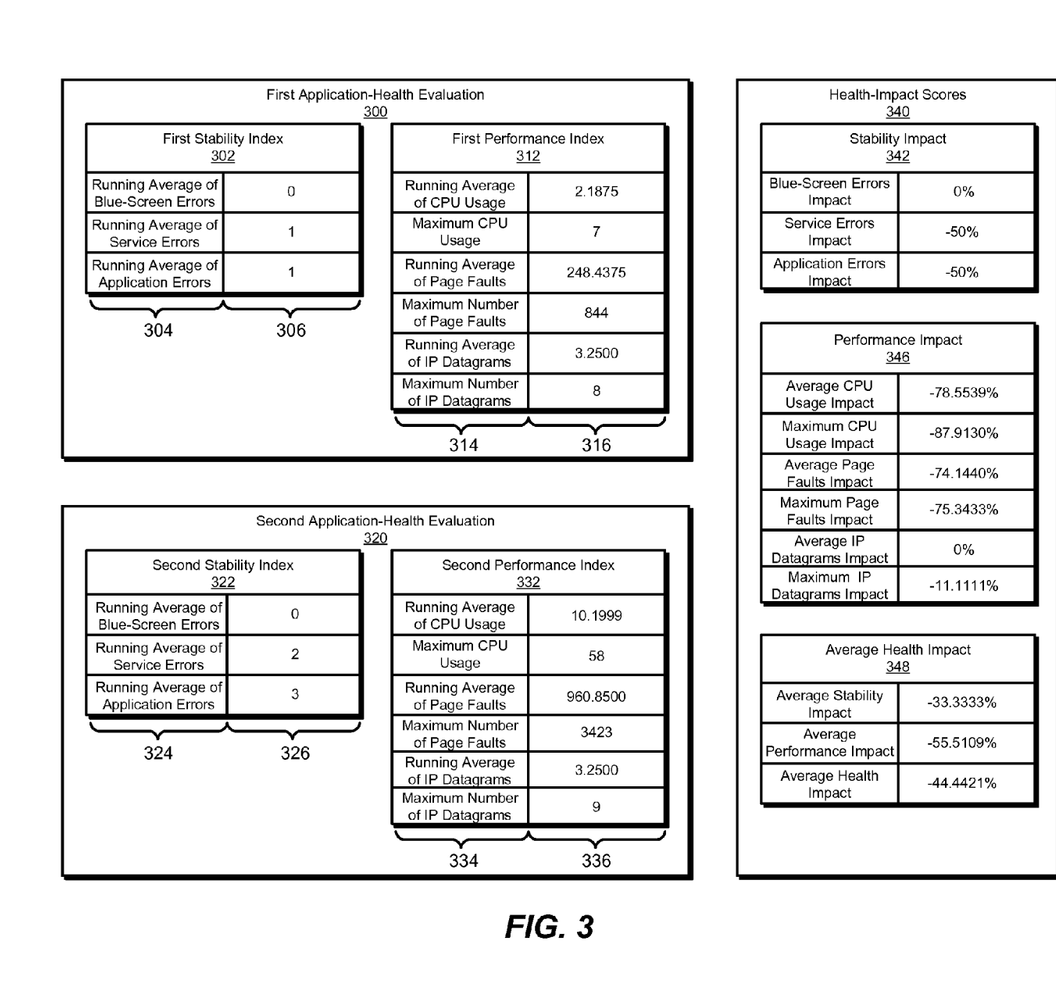
FIG. 3 is a block diagram illustrating the results of exemplary health evaluations that may be performed according to at least one embodiment.

As with stability indexes 302 and 322, performance indexes 312 and 332 may comprise a plurality of performance metrics 314 and 334 and results 316 and 336 for each of these metrics. Performance metrics 314 and 334 generally represent any type or form of metric that may be used to measure the performance of an application. Examples of values that performance metrics may measure include, without limitation, CPU usage, page faults, network usage, and memory usage. As illustrated in FIG. 3, the results 306, 316, 326, and 336 of stability metrics 304 and 324 and performance metrics 314 and 334 may be represented using running averages, maximum or peak values, incremental count values, or any other suitable method. In the example provided in FIG. 3, performance indexes 312 and 332 detail the application's maximum and average CPU usage during the evaluation period, the maximum and average number of page faults caused by the application during the evaluation period, and the maximum and average number of IP datagrams sent and received by the application during the evaluation period.

As detailed above, the client module may determine whether the security-feature-enablement rule impacted the health of the application by comparing the first and second application-health evaluations. For example, the client module may compare the results of first health evaluation 300 in FIG. 3 with the results of second health evaluation 320 to determine whether the security feature (or combination of security features) enabled by the security-feature-enablement rule for the legacy application negatively impacted the health of the legacy application.

The impact of an enabled security feature on the health of a legacy application may be expressed or quantified in a variety of ways. In certain embodiments, one or more health-impact scores, such as health-impact scores 340 in FIG. 3, may be calculated based on the results of first health evaluation 300 and second health evaluation 320. As illustrated in FIG. 3, health-impact scores 340 may represent the impact an enabled or injected security feature has on the stability (as represented by the results contained in stability-impact table 342) and performance (as represented by the results contained in performance-impact table 346) of a legacy application installed on a client system. For example, the results in stability-impact table 342 may demonstrate whether there has been a percentage increase in blue-screen errors, service errors, and/or application errors subsequent to enabling the security feature (or combination of security features) for the legacy application. Similarly, the results in performance-impact table 346 may demonstrate whether there has been a percentage increase in CPU usage, memory usage, page faults, and/or network usage subsequent to enabling the security feature.

For example, the results contained in stability-impact table 342 in FIG. 3 demonstrate that there has been a 50% increase in the average number of service and application-related errors experienced by the system subsequent to enabling the security feature. Similarly, the results contained in performance-impact table 346 demonstrate that there has been a significant increase in average CPU usage (78.22.6%), maximum CPU usage (87.9130%), average number of page faults (74.1440%), maximum number of page faults (75.3433%), and maximum number of IP datagrams (11.1111%) subsequent to enabling the security feature.

In at least one embodiment, an average stability-impact score may be calculated for the enabled security feature by averaging the results contained in stability-impact table 342 (which, in the example illustrated in FIG. 3, results in an average stability-impact score of −33.3333%). Similarly, an average performance-impact score for the enabled security feature may be calculated by averaging the results contained in performance-impact table 346 (which, in the example illustrated in FIG. 3 results in an average performance-impact score of −55.5109%). An overall health-impact score for the enabled security feature may then be calculated by averaging the average stability-impact score with the average performance-impact score (which, in the example illustrated in FIG. 3, results in an overall health-impact score of −44.4421%).

Returning to FIG. 2, at step 210 the client module may relay information that identifies the impact of the security-feature-enablement rule on the health of the legacy application to a server. For example, a client module stored on client system 110(1) in FIG. 1 may transmit information to server 130 that is relevant to assessing how the security feature(s) enabled by the security-feature-enablement rule executed in step 206 affected the performance and/or functionality of the legacy application. In some examples, this information, also referred to herein as "health-impact information," may represent or be based on health-impact scores, such as health-impact scores 340 in FIG. 3. Upon completion of step 210 in FIG. 2, exemplary method 200 may terminate.

As detailed above, the potential impact of an enabled security feature on the health of a legacy application may be expressed or quantified in a variety of ways. As such, while the health evaluations and results illustrated in FIG. 3 have been described with a certain degree of particularity, the potential impact of an enabled security feature on the health of a legacy application may be calculated using any number of additional heuristics, formulas, or methods.

In addition, one or more of steps 202-210 in FIG. 2 may be performed by a local system (such as client systems 140 in FIG. 1 and/or computing system 510 in FIG. 5), by a remote system (such as server 130 in FIG. 1 and/or portions of exemplary network architecture 600 in FIG. 6), or any combination thereof. For example, a local system, such as client system 110(1) in FIG. 1 and/or computing system 510 in FIG. 5, may determine the impact of an enabled security feature on the health of a legacy application in step 208 by comparing the results of a first health evaluation with the results of a second health evaluation.

Figure 6:
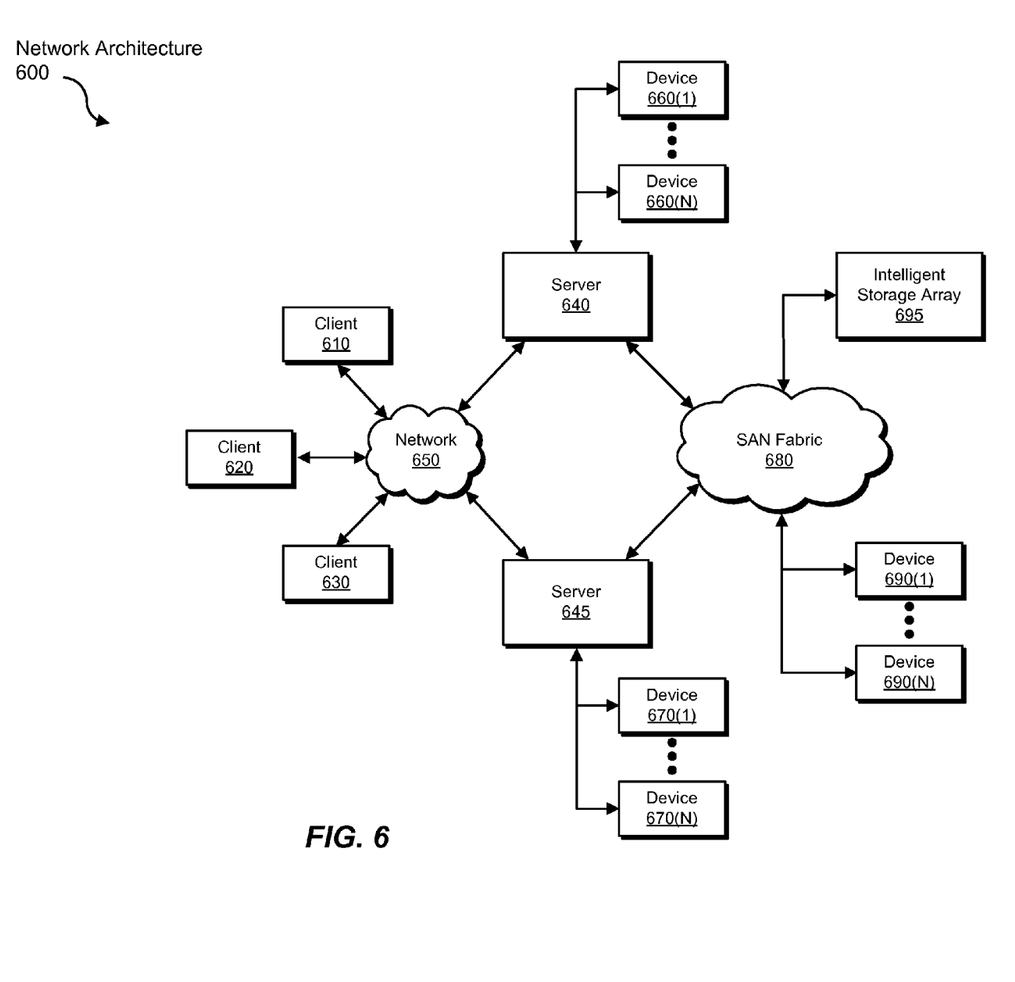
FIG. 6 is a block diagram of an exemplary computing network capable of implementing one or more of the embodiments described and/or illustrated herein.

Alternatively, a remote computing device, such as server 130 in FIG. 1 and/or portions of exemplary network architecture 600 in FIG. 6, may determine the impact of an enabled security feature on the health of a legacy application in step 208 by comparing the results of a first health evaluation with the results of a second health evaluation. For example, client system 110(1) in FIG. 1 may transmit the results of the first and second health evaluations, along with a checksum or hash calculated for the legacy application, to server 130 in FIG. 1. In some embodiments, client system 110(1) in FIG. 1 may also send a list to server 130 that identifies each legacy application on client system 110(1). Server 130 may then determine whether the enabled security feature impacted the health of the legacy application by comparing the results of the second health evaluation with the results of the first health evaluation. For example, server 130 may calculate one or more health-impact scores, such as health-impact scores 340 in FIG. 3, for the enabled security feature by comparing the results from the first health evaluation with the results of the second health evaluation. Server 130 may then store the resulting health-impact score or scores in a database.

Although not illustrated in FIG. 2, in certain embodiments the client module may receive an instruction from server 130 in FIG. 1 to disable the security-feature-enablement rule for the legacy application. For example, server 130 might determine, based on health-impact information, that a security-feature-enablement rule is likely to decrease the performance and/or stability of a legacy application. Server 130 might then send an instruction to the client module to disable the security-feature-enablement rule for the legacy application. Upon receiving the instruction, the client module may disable the security-feature-enablement rule for the legacy application.

In addition, in some embodiments exemplary method 200 in FIG. 2 may also comprise identifying a request from a user to opt in to early testing of security-feature-enablement rules. For example, a client module on client system 110(1) in FIG. 1 may present a user of client system 110(1) with the option of enabling new security features in one or more legacy applications installed on client system 110(1), with the understanding that usage data will be reported to a backend or server, such as server 130 in FIG. 1. As will be described in greater detail below, server 130 may analyze this usage data to determine whether to initiate staged roll-outs of specific security features for legacy applications to large groups of users.

FIG. 4 is a flow diagram of an exemplary server-side method 400 for enabling community-tested security features for legacy applications. As illustrated in this figure, at step 402 the server module may identify a plurality of client systems. In at least one example, this plurality of client systems may represent a set of clients that receive community-tested security features for legacy applications from a server. For example, a server module stored and configured to run on server 130 in FIG. 1 may identify a plurality of client systems 140 in FIG. 1, consisting of clients 110(1) through 110(Y), on which the client module described in connection with FIG. 2 has been installed.

The server module may perform step 402 in a variety of ways. In one example, the server module may access a list of client systems that have the client module installed and may load this list into memory. In an additional example, the server module may receive communications from client systems (such as client systems 140 in FIG. 1) that identify the client systems as having the client module described above installed.

At step 404, the server module may identify a subset of the plurality of client systems. In one example, each client system within this subset may be designated to test security features for legacy applications. For example, a server module on server 130 in FIG. 1 may identify a subset 142 of client systems 140, consisting of clients 110(X) through 110(Y). In this example, subset 142 may represent a subset of client systems within a community that has been designated to test security features for legacy applications before or as part of a staged roll-out. For example, in some embodiments a user of a client system may opt in to early testing of security features, as detailed above. In this example, the client system of this user would then belong to subset 142. This subset may represent as few as 0.1% of all users within a community that have elected to receive security-feature-enablement rules from a server.

The server module may perform step 404 in a variety of ways. In one example, the server module may access a list of client systems that have opted in to early testing of security features. In an additional example, the server module may receive communications from client systems (such as client systems 140 in FIG. 1) that identify the client systems as having opted in to early testing of security features.

At step 406, the server module may transmit a security-feature-enablement rule to at least one client system in the subset identified in step 404. For example, a server module stored on server 130 in FIG. 1 may send an instruction to at least one client system within subset 142 to enable a particular security feature or combination of security features for a particular legacy application.

The server module may perform step 406 in a variety of ways. In one example, the server module may access a network interface card on server 130 in FIG. 1 and transmit a security-feature-enablement rule across network 120 to a client (such as client 110(X)) within subset 142.

In a different example, the server module may transmit the rule to the client system by transmitting the rule to a second server. For example, server 130 may transmit a security-feature-enablement rule to a second server. The second server may then modify a security update file for the client system to include the security-feature-enablement rule. The second server may then transmit the security update file to the client system via network 120.

After transmitting the security-feature-enablement rule to the client system in the subset, at step 408 the server module may receive health-impact information from the client system that identifies the impact of the security-feature-enablement rule on the health of a legacy application on the client system. In other words, the server module may receive information from the client system that indicates whether the security-feature-enablement rule destabilized or otherwise harmed the performance of the legacy application. For example, the server module may receive a health-impact score (such as health-impact scores 340 in FIG. 3) of −10% from the client module, indicating that the health of the legacy application decreased after enabling the security feature. The server module might also receive a crash report for the legacy application or another type of error report (such as the results of application-health evaluations 300 and 320 in FIG. 3) that indicates reduced functionality or performance for the legacy application or client system.

In one embodiment, the server module may aggregate and store the health-impact information it receives in step 408. For example, the server module may calculate and store a health-impact score for a security-feature-enablement rule based on health-impact information received from the subset of client systems. In one example, the server module may store this health-impact score as a running average.

At step 410, the server module may then determine, based on the health-impact information received in step 408, whether to roll out the security-feature-enablement rule to additional client systems. In other words, if the health-impact information received in step 408 does not indicate negative effects (for example, if the server receives a health-impact score for the security feature from at least one client system that indicates that the security feature did not negatively impact the health of the legacy application), the server module may determine to roll out the security-feature-enablement rule to additional client systems within the plurality of client systems identified in step 402.

The server module may perform step 410 in a variety of ways. In one example, the server module may receive health-impact information from a single client system (such as client 110(X) within subset 142) that indicates that the security-feature-enablement rule did not have a negative effect on the legacy application. In this example, the server module may determine to roll out the security-feature-enablement rule to a larger subset of client systems within client systems 140.

In another example, the server module may receive health-impact information from a plurality of client systems within the subset identified in step 404. For example, server 130 may receive health-impact information from each of clients 110(X) through 110(Y) in subset 142. In this example, the server module may determine whether, on average, the security-feature-enablement rule negatively impacted the health of legacy applications on the clients within subset 142. For example, the server module may calculate, based on the health-impact information received from clients within subset 142, an average health-impact score for the security-feature-enablement rule. In this example, the server module may determine to roll out the security-feature-enablement rule to the remainder of client systems 140 if the average health-impact score indicates that, on average, the security-feature-enablement rule did not significantly negatively impact the heath of legacy applications on clients within subset 142.

In a further embodiment, the server module may initiate a staged roll-out of the security-feature-enablement rule to additional client systems if the server module determines that the security-feature-enablement rule did not negatively impact the health of legacy applications on client systems within subset 142. As previously mentioned, a staged roll-out may represent an incrementally wider distribution of the security-feature-enablement rule. For example, if the health-impact information received from the subset of client systems indicates that the security-feature-enablement rule did not have a negative impact on the health of the legacy application, then the server may gradually widen the set of client systems that receive the security-feature-enablement rule, all the while continually receiving and monitoring health-impact information from these additional client systems. For example, the server may roll out the security-feature-enablement rule to an increasingly larger subset of client systems within the community, starting, for example, with 1% of its users and gradually increasing to 2%, 5%, 10%, 20%, 50%, and eventually 100% of the community.

As long as the server continues to receive health-impact information that indicates that the security-feature-enablement rule does not negatively impact the health of the legacy application, the server may continue to gradually roll out the security-feature enablement rule. However, if the server receives health-impact information that indicates that the security-feature-enablement rule is significantly negatively impacting the health of the legacy application, then the server may abort the staged roll-out. For example, as detailed above, the server module may generate a running-average health-impact score for a security-feature-enablement rule based on health-impact information received from client systems within the community. If the server module determines, upon rolling out the security-feature-enablement rule to a larger subset of users, that this health-impact score drops unacceptably (for example, if the health-impact score for a security-feature-enablement rule drops from 0 to −55%), then the server module may abort the staged roll-out.

As detailed above, the systems and methods described herein may enable security vendors to easily test security features for legacy applications. By rolling out security features on a staged basis, security vendors may safely test the impact of security features on the health of legacy applications within a small subset of users prior to distributing the security features to the entire community.

Figure 5:
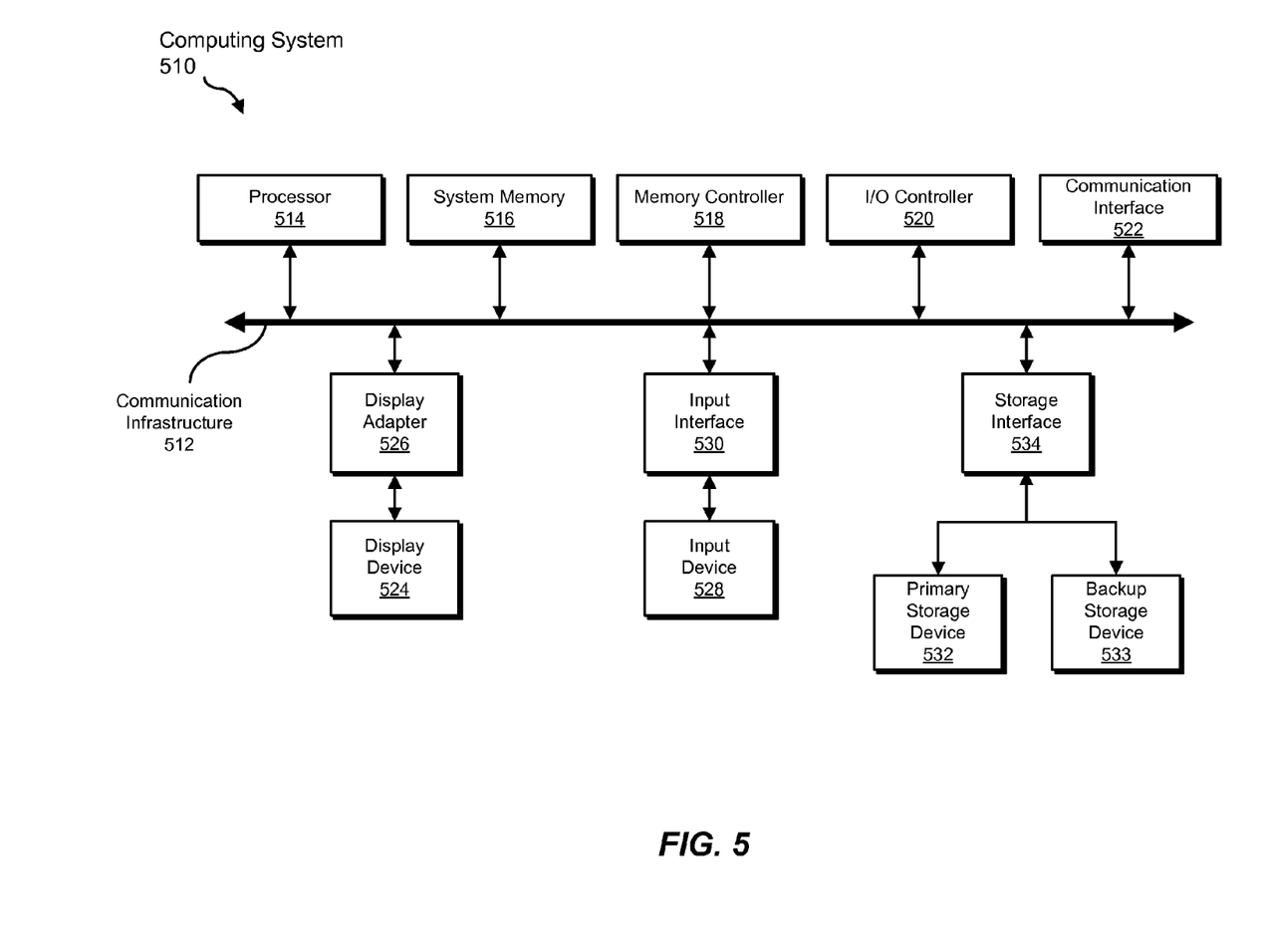
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may comprise at least one processor 514 and system memory 516.

Processor 514 generally represents any type or form of processing unit capable of processing data or interpreting and executing instructions. In certain embodiments, Processor 514 may receive instructions from a software application or module. These instructions may cause processor 514 to perform the functions of one or more of the exemplary embodiments described and/or illustrated herein. For example, processor 514 may perform and/or be a means for performing, either alone or in combination with other elements, one or more of the identifying, executing, enabling, determining, relaying, performing, comparing, allowing, transmitting, receiving, disabling, retrieving, initiating, aborting, and/or increasing steps described herein. Processor 514 may also perform and/or be a means for performing any other steps, methods, or processes described and/or illustrated herein.

System memory 516 generally represents any type or form of volatile or non-volatile storage device or medium capable of storing data and/or other computer-readable instructions. Examples of system memory 516 include, without limitation, random access memory (RAM), read only memory (ROM), flash memory, or any other suitable memory device. Although not required, in certain embodiments computing system 510 may comprise both a volatile memory unit (such as, for example, system memory 516) and a non-volatile storage device (such as, for example, primary storage device 532, as described in detail below).

In certain embodiments, exemplary computing system 510 may also comprise one or more components or elements in addition to processor 514 and system memory 516. For example, as illustrated in FIG. 5, computing system 510 may comprise a memory controller 518, an input/output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an ISA, PCI, PCIe, or similar bus) and a network.

Memory controller 518 generally represents any type or form of device capable of handling memory or data or controlling communication between one or more components of computing system 510. For example, in certain embodiments, memory controller 518 may control communication between processor 514, system memory 516, and I/O controller 520 via communication infrastructure 512. In certain embodiments, memory controller 518 may perform and/or is a means for performing, either alone or in combination with other elements, one or more of the steps or features described and/or illustrated herein, such as identifying, executing, enabling, determining, relaying, performing, comparing, allowing, transmitting, receiving, disabling, retrieving, initiating, aborting, and/or increasing.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534. I/O controller 520 may be used, for example, to perform and/or be a means for identifying, enabling, determining, relaying, performing, comparing, allowing, transmitting, receiving, disabling, retrieving, executing, initiating, aborting, and/or increasing steps described herein. I/O controller 520 may also be used to perform and/or be a means for performing other steps and features set forth in the instant disclosure.

Communication interface 522 broadly represents any type or form of communication device or adapter capable of facilitating communication between exemplary computing system 510 and one or more additional devices. For example, in certain embodiments, communication interface 522 may facilitate communication between computing system 510 and a private or public network comprising additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the internet. Communication interface 522 may also indirectly provide such a connection through, for example, a local area network (such as an Ethernet network or a wireless IEEE 802.11 network), a personal area network (such as a BLUETOOTH or IEEE Standard 802.15.1-2002 network), a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution. In certain embodiments, communication interface 522 may perform and/or be a means for performing, either alone or in combination with other elements, one or more of the identifying, enabling, determining, relaying, performing, comparing, allowing, transmitting, receiving, disabling, executing, retrieving, initiating, aborting, and/or increasing steps disclosed herein. Communication interface 522 may also be used to perform and/or be a means for performing other steps and features set forth in the instant disclosure.

As illustrated in FIG. 5, computing system 510 may also comprise at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also comprise at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device. In at least one embodiment, input device 528 may perform and/or be a means for performing, either alone or in combination with other elements, one or more of the identifying, enabling, determining, relaying, performing, comparing, executing, allowing, transmitting, receiving, disabling, retrieving, initiating, aborting, and/or increasing steps disclosed herein. Input device 528 may also be used to perform and/or be a means for performing other steps and features set forth in the instant disclosure.

As illustrated in FIG. 5, exemplary computing system 510 may also comprise a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a floppy disk drive, a magnetic tape drive, an optical disk drive, a flash drive, or the like. Storage interface 534 generally represents any type or form of interface or device for transferring data between storage devices 532 and 533 and other components of computing system 510.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also comprise other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Storage devices 532 and 533 may also be used, for example, to perform and/or be a means for performing, either alone or in combination with other elements, one or more of the identifying, identifying, enabling, determining, relaying, performing, comparing, allowing, transmitting, executing, receiving, disabling, retrieving, initiating, aborting, and/or increasing steps disclosed herein. Storage devices 532 and 533 may also be used to perform and/or be a means for performing other steps and features set forth in the instant disclosure.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an application specific integrated circuit (ASIC) adapted to implement one or more of the exemplary embodiments disclosed herein.

FIG. 6 is a block diagram of an exemplary network architecture 600 in which client systems 610, 620, and 630 and servers 640 and 645 may be coupled to a network 650. Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or to run certain software applications. Network 650 generally represents any telecommunication or computer network; including, for example, an intranet, a wide area network (WAN), a local area network (LAN), a personal area network (PAN), or the internet.

As illustrated in FIG. 6, one or more storage devices 660 (1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent network-attached storage (NAS) devices configured to communicate with servers 640 and 645 using various protocols, such as NFS, SMB, or CIFS.

Servers 640 and 645 may also be connected to a storage area network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690 (1)-(N), or intelligent storage array 695. Although FIG. 6 depicts the use of a network (such as the internet) for exchanging data, the embodiments described and/or illustrated herein are not limited to the internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650. Accordingly, network architecture 600 may perform and/or be a means for performing, either alone or in combination with other elements, one or more of the identifying, enabling, determining, relaying, performing, comparing, allowing, transmitting, receiving, disabling, retrieving, initiating, executing, aborting, and/or increasing steps disclosed herein. Network Architecture 600 may also be used to perform and/or be a means for performing other steps and features set forth in the instant disclosure.

As detailed above, computing system 510 and/or one or more of the components of network architecture 600 may perform and/or be a means for performing, either alone or in combination with other elements, one or more steps of the exemplary methods described and/or illustrated herein. For example, a computer-implemented method for enabling community-tested security features for legacy applications may comprise identifying a plurality of client systems. The computer system may then identify a subset of the plurality of client systems that is designated to test security features for legacy applications. The computer system may then transmit a security-feature-enablement rule to at least one client system in the subset. The computer system may subsequently receive, from the client system in the subset, health-impact information that identifies the impact of the security-feature-enablement rule on the health of a legacy application on the client system and then determine, based on the health-impact information, whether to roll out the security-feature-enablement rule to the plurality of client systems.

Certain embodiments further comprise determining that the security-feature-enablement rule did not negatively impact the health of the legacy application and initiating a staged roll-out of the security-feature-enablement rule to the plurality of client systems. Some embodiments further comprise: 1) receiving, from at least one additional client system in the plurality of client systems, health-impact information relating to the security-feature-enablement rule, 2) determining that the security-feature-enablement rule negatively impacted the health of at least one legacy application on the additional client system, and then 3) aborting the staged roll-out of the security-feature-enablement rule. In some further embodiments, the staged roll-out comprises increasing distribution of the security-feature-enablement rule by increments in multiple stages until the distribution encompasses the plurality of client systems.

In at least one further embodiment, a security-feature-enablement rule comprises a particular combination of security-feature-enablement rules. In some embodiments, health-impact information comprises a performance index containing results for at least one performance metric and a stability index containing results for at least one stability metric.

According to some embodiments, the computer-implemented method for enabling community-tested security features for legacy applications comprises identifying a legacy application on a client system. The computer system may also identify a security-feature-enablement rule for the legacy application. The computer system may then enable at least one security feature for the legacy application by executing the security-feature-enablement rule. The computer system may subsequently determine the impact of the security-feature-enablement rule on the health of the legacy application. The computer system may then relay the impact of the security feature on the health of the legacy application to a server. In some further embodiments, identifying the security-feature-enablement rule comprises receiving the security feature enablement rule from the server.

By some embodiments, determining the impact of the security-feature-enablement rule on the health of the legacy application comprises performing a first health evaluation. The computer system may then execute the security-feature-enablement-rule into the legacy application and then perform a second health evaluation. The computer system may then compare the second health evaluation with the first health evaluation to determine how the security-feature-enablement rule impacted the health of the legacy application.

As defined in some embodiments, the method further comprises allowing a user to opt in to early testing of security-feature-enablement rules. According to some embodiments, the computer system may send a list to the server that identifies each legacy application on the client system. In addition, the security-feature-enablement rule may comprise a particular combination of security-feature-enablement rules.

In several embodiments, the computer system may receive an instruction from the server to disable the security-feature-enablement rule for the legacy application and then disable the security-feature-enablement rule for the legacy application. In some embodiments, executing the security-feature-enablement rule comprises identifying the legacy application at its startup, retrieving the security configuration for the legacy application, and enabling a security feature in the security configuration, as specified by the security-feature-enablement rule.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The preceding description has been provided to enable others skilled in the art to best utilize various aspects of the exemplary embodiments described herein. This exemplary description is not intended to be exhaustive or to be limited to any precise form disclosed. Many modifications and variations are possible without departing from the spirit and scope of the instant disclosure. It is desired that the embodiments described herein be considered in all respects illustrative and not restrictive and that reference be made to the appended claims and their equivalents for determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

We claim:

1. A computer-implemented method for enabling community-tested security features for legacy applications, the method comprising:
    identifying a plurality of client systems;
    identifying a subset of the plurality of client systems that is designated to test security features for legacy applications;
    transmitting a security-feature-enablement rule to each client system in the subset that, when executed, enables a security feature available on the client system;
    receiving, from each client system in the subset, health-impact information that identifies the impact, on the health of a legacy application on the client system, of executing the security-feature-enablement rule to enable the security feature;
    identifying a health-impact score that quantifies the impact of the enabled security feature on the health of the legacy applications on the client systems within the subset;
    determining, based on the health-impact score that quantifies the impact of the enabled security feature, whether to roll out the security-feature-enablement rule to the plurality of client systems at least in part by determining whether, on average, the security-feature-enablement rule negatively impacted the health of legacy applications on the client systems within the subset, the method being performed by a server-side computing device that comprises at least one processor.

2. The method of claim 1, further comprising:
    determining, by analyzing the health-impact information, that the security-feature-enablement rule did not negatively impact the health of the legacy application;
    initiating a staged roll-out of the security-feature-enablement rule to the plurality of client systems.

3. The method of claim 2, further comprising:
    receiving, from at least one additional client system within the plurality of client systems, health-impact information for the security-feature-enablement rule;
    determining, by analyzing the health-impact information received from the additional client system, that the security-feature-enablement rule negatively impacted the health of a legacy application on the additional client system;
    aborting the staged roll-out of the security-feature-enablement rule.

4. The method of claim 2, wherein initiating the staged roll-out comprises increasing distribution of the security-feature-enablement rule by increments in multiple stages until the distribution encompasses the plurality of client systems.

5. The method of claim 1, wherein the security-feature-enablement rule comprises a particular combination of security-feature-enablement rules.

6. The method of claim 1, wherein the health-impact information comprises:
    a performance index containing results for at least one performance metric;
    a stability index containing results for at least one stability metric.

7. The method of claim 1, further comprising calculating and storing the health-impact score, as a running average, for the security-feature-enablement rule based on health-impact information received from the subset.

8. The method of claim 7, further comprising determining to roll out the security-feature-enablement rule to a remainder of client systems when the running average health-impact score indicates that, on average, the security-feature-enablement rule did not substantially negatively impact the health of legacy applications on clients systems within the subset.

9. The method of claim 7, further comprising:
    determining, upon rolling out the security-feature-enablement rule to a larger subset of client systems, whether the health-impact score drops to an unacceptable level;
    determining whether to abort a staged roll-out based on whether the health-impact score drops to the unacceptable level.

10. The method of claim 1, wherein the security-feature-enablement rule enables heap corruption termination.

11. The method of claim 1, further comprising accessing a list of client systems that opted in to testing of security features.

12. The method of claim 1, wherein transmitting the security-feature-enablement rule comprises sending an instruction to the client system within the subset to enable the security feature for the legacy application.

13. The method of claim 1, further comprising rolling out the security-feature-enablement rule so long as the server-side computing device continues to receive health-impact information that indicates that the security-feature-enablement rule is not negatively impacting the health of legacy applications.

14. A system for enabling community-tested security features for legacy applications, the system comprising:
    at least one processor;
    a server module, stored in memory, that:
    identifies a plurality of client systems;
    identifies a subset of the plurality of client systems that is designated to test security features for legacy applications;
    transmits a security-feature-enablement rule to each client system in the subset that, when executed, enables a security feature available on the client system;
    receives, from each client system in the subset, health-impact information that identifies the impact, on the health of a legacy application on the client system, of executing the security-feature-enablement rule to enable the security feature;
    identifies a health-impact score that quantifies the impact of the enabled security feature on the health of the legacy applications on the client systems within the subset;
    determines, based on the health-impact score that quantifies the impact of the enabled security feature, whether to roll out the security-feature-enablement rule to the plurality of client systems at least in part by determining whether, on average, the security-feature-enablement rule negatively impacted the health of legacy applications on the client systems within the subset.

15. The system of claim 14, wherein the server module calculates the health-impact score, as a running average, for the security-feature-enablement rule based on health-impact information received from the subset.

16. The system of claim 15, wherein the server module determines to roll out the security-feature-enablement rule to a remainder of client systems when the running average health-impact score indicates that, on average, the security-feature-enablement rule did not substantially negatively impact the health of legacy applications on clients systems within the subset.

17. The system of claim 15, wherein the server module:
- determines, upon rolling out the security-feature-enablement rule to a larger subset of client systems, whether the health-impact score drops to an unacceptable level;
- determines whether to abort a staged roll-out based on whether the health-impact score drops to the unacceptable level.

18. The system of claim 14, wherein the security-feature-enablement rule enables heap corruption termination.

19. The system of claim 14, wherein the server module accesses a list of client systems that opted in to testing of security features.

20. A non-transitory computer-readable-storage-medium containing instructions that, when executed by at least one processor of a computing device, cause the computing device to:
- identify a plurality of client systems;
- identify a subset of the plurality of client systems that is designated to test security features for legacy applications;
- transmit a security-feature-enablement rule to each client system in the subset that, when executed, enables a security feature available on the client system;
- receive, from each client system in the subset, health-impact information that identifies the impact, on the health of a legacy application on the client system, of executing the security-feature-enablement rule to enable the security feature;
- identify a health-impact score that quantifies the impact of the enabled security feature on the health of the legacy applications on the client systems within the subset;
- determine, based on the health-impact score that quantifies the impact of the enabled security feature, whether to roll out the security-feature-enablement rule to the plurality of client systems at least in part by determining whether, on average, the security-feature-enablement rule negatively impacted the health of legacy applications on the client systems within the subset.

* * * * *